US007839346B2

(12) United States Patent
Bittar et al.

(10) Patent No.: US 7,839,346 B2
(45) **Date of Patent: *Nov. 23, 2010**

(54) RUGGEDIZED MULTI-LAYER PRINTED CIRCUIT BOARD BASED DOWNHOLE ANTENNA

(75) Inventors: Michael S. Bittar, Houston, TX (US); Jesse K. Hensarling, Cleveland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/243,131

(22) Filed: Oct. 4, 2005

(65) Prior Publication Data

US 2006/0022887 A1 Feb. 2, 2006

Related U.S. Application Data

(63) Continuation of application No. 10/254,184, filed on Sep. 25, 2002, now Pat. No. 7,098,858.

(51) Int. Cl.
*H01Q 1/04* (2006.01)
*G01V 3/30* (2006.01)

(52) U.S. Cl. ...................................... 343/719; 324/338

(58) Field of Classification Search ................. 343/787, 343/788, 719, 895; 324/338; 175/61

See application file for complete search history.

(56) References Cited

U.S. PATENT DOCUMENTS

| | | | | |
|---|---|---|---|---|
| 3,268,274 | A | | 8/1966 | Ortloff et al. |
| 3,944,910 | A | | 3/1976 | Rau |
| 3,973,181 | A | | 8/1976 | Calvert |
| 4,052,662 | A | | 10/1977 | Rau |
| 4,383,220 | A | | 5/1983 | Baldwin |
| 4,468,623 | A | | 8/1984 | Gianzero et al. |
| 4,511,842 | A | | 4/1985 | Moran et al. |
| 4,670,717 | A | | 6/1987 | Sender |
| 4,814,782 | A | | 3/1989 | Chai |
| 4,851,855 | A | | 7/1989 | Tsukamoto et al. |
| 4,899,112 | A | * | 2/1990 | Clark et al. ................. 324/338 |
| 5,014,071 | A | | 5/1991 | King |

(Continued)

FOREIGN PATENT DOCUMENTS

| | | | |
|---|---|---|---|
| EP | 0 778 473 | B1 | 4/2004 |
| GB | 2 156 527 | A | 10/1985 |
| JP | 59 017705 | A | 1/1984 |
| JP | 405218726 | A | 8/1993 |

OTHER PUBLICATIONS

EPO International Search Report, International Application No. PCT/US03/29791, dated Sep. 20, 2005.

(Continued)

*Primary Examiner*—Michael C Wimer
(74) *Attorney, Agent, or Firm*—Mark E. Scott; Conley Rose, P.C.

(57) ABSTRACT

The specification discloses a printed circuit board (PCB) based ferrite core antenna. The traces of PCBs form the windings for the antenna, and various layers of the PCB hold a ferrite core for the windings in place. The specification further discloses use of such PCB based ferrite core antennas in downhole electromagnetic wave resistivity tools such that azimuthally sensitivity resistivity readings may be taken, and borehole imaging can be performed, even in oil-based drilling fluids.

26 Claims, 4 Drawing Sheets

U.S. PATENT DOCUMENTS

| | | | | |
|---|---|---|---|---|
| 5,089,779 | A | 2/1992 | Rorden | |
| 5,184,079 | A | 2/1993 | Barber | |
| 5,200,705 | A * | 4/1993 | Clark et al. | 324/338 |
| 5,235,285 | A * | 8/1993 | Clark et al. | 324/342 |
| 5,309,404 | A | 5/1994 | Kostek | |
| 5,339,036 | A * | 8/1994 | Clark et al. | 324/338 |
| 5,428,293 | A * | 6/1995 | Sinclair et al. | 324/339 |
| 5,465,799 | A | 11/1995 | Ho | |
| 5,508,616 | A | 4/1996 | Sato | |
| 5,530,358 | A | 6/1996 | Wisler | |
| 5,561,438 | A | 10/1996 | Nakazawa et al. | |
| 5,594,343 | A * | 1/1997 | Clark et al. | 324/338 |
| 5,870,065 | A | 2/1999 | Kanba et al. | |
| 5,870,066 | A | 2/1999 | Asakura et al. | |
| 6,088,655 | A | 7/2000 | Daily | |
| 6,092,610 | A * | 7/2000 | Kosmala et al. | 175/61 |
| 6,100,696 | A | 8/2000 | Sinclair | |
| 6,173,793 | B1 | 1/2001 | Thompson et al. | |
| 6,181,138 | B1 | 1/2001 | Hagiwara | |
| 6,190,493 | B1 | 2/2001 | Watanabe et al. | |
| 6,206,108 | B1 | 3/2001 | MacDonald | |
| 6,222,489 | B1 | 4/2001 | Tsuru et al. | |
| 6,268,726 | B1 | 7/2001 | Prammer et al. | |
| 6,271,803 | B1 | 8/2001 | Watanabe et al. | |
| 6,388,636 | B1 | 5/2002 | Brown et al. | |
| 6,476,609 | B1 | 11/2002 | Bittar | |
| 6,765,385 | B2 * | 7/2004 | Sinclair et al. | 324/338 |
| 6,833,795 | B1 | 12/2004 | Johnson | |
| 6,900,640 | B2 | 5/2005 | Fanini | |
| 6,911,824 | B2 | 6/2005 | Bittar | |
| 7,046,009 | B2 | 5/2006 | Itskovich | |
| 7,057,392 | B2 | 6/2006 | Wang | |
| 7,098,858 | B2 * | 8/2006 | Bittar et al. | 343/719 |
| 7,141,981 | B2 | 11/2006 | Folberth | |
| 7,345,487 | B2 | 3/2008 | Bittar | |
| 2002/0113747 | A1 * | 8/2002 | Tessier et al. | 343/787 |
| 2002/0134587 | A1 | 9/2002 | Rester et al. | |
| 2003/0229449 | A1 | 12/2003 | Merchant | |
| 2006/0017443 | A1 | 1/2006 | Folberth | |
| 2006/0149477 | A1 | 7/2006 | Cairns | |
| 2006/0255810 | A1 | 11/2006 | Yu | |

OTHER PUBLICATIONS

Australian Examiner's Report—Serial No. 2003275099, dated Jul. 26, 2006.

Australian Examiner's Report—Serial No. 2003275099, dated Nov. 7, 2006.

Response to 2nd Australian Examiner's Report—Serial No. 2003275099, dated Mar. 21, 2007.

EPO Examination Report—Serial No. 03759370.4, dated Feb. 5, 2007.

Response to EPO Examination Report—Serial No. 03759370.4 dated Aug. 13, 2007.

U.S. Office Action—U.S. Appl. No. 11/385,404, dated Jan. 9, 2007.

Response to U.S. Office Action—U.S. Appl. No. 11/385,404, dated Apr. 4, 2007.

U.S. Office Action—U.S. Appl. No. 11/385,404, dated Jun. 13, 2007.

Response to U.S. Office Action—U.S. Appl. No. 11/385,404, dated Aug. 29, 2007.

International Search Report and Written Opinion for PCT Patent Application No. PCT/US2007/063264, filed Mar. 5, 2007.

United Kingdom Response to Office Action—Serial No. 0816505.2, dated Aug. 13, 2009.

EPO Examination Report—Serial No. 03 759 370.4, dated Feb. 18, 2010.

* cited by examiner

RUGGEDIZED MULTI-LAYER PRINTED CIRCUIT BOARD BASED DOWNHOLE ANTENNA

CROSS-REFERENCE TO RELATED APPLICATIONS

This application is a continuation of application serial number 10/254,184 filed Sep. 25, 2002, titled, "Ruggedized multi-layer printed circuit board based downhole antenna," now U.S. Pat. No. 7,098,858, which is incorporated by reference herein as if reproduced in full below.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to downhole tools. More particularly, the preferred embodiments are directed to antennas that allow azimuthally sensitive electromagnetic wave resistivity measurements of formations surrounding a borehole, and for resistivity-based borehole imaging.

2. Background of the Invention

FIG. 1 exemplifies a related art induction-type logging tool. In particular, the tool 10 is within a borehole 13, either as a wireline device or as part of a bottomhole assembly in a measuring-while-drilling (MWD) process. Induction logging-while-drilling (LWD) tools of the related art typically comprise a transmitting antenna loop 12, which comprises a single loop extending around the circumference of the tool 10, and two or more receiving antennas 14A and 14B. The receiving antennas 14A, B are generally spaced apart from each other and from the transmitting antenna 12, and the receiving antennas comprise the same loop antenna structure as used for the transmitting antenna 12.

The loop antenna 12, and the receiving loop antennas 14A, B, used in the related art are not azimuthally sensitive. In other words, the electromagnetic wave propagating from the transmitting antenna 12 propagates in all directions simultaneously. Likewise, the receiving antennas 14A, B are not azimuthally sensitive. Thus, tools such as that shown in FIG. 1 are not suited for taking azimuthally sensitive readings, such as for borehole imaging. However, wave propagation tools such as that shown in FIG. 1, which operate using electromagnetic radiation or electromagnetic wave propagation (an exemplary path of the wave propagation shown in dashed lines) are capable of operation in a borehole utilizing oil-based (non-conductive) drilling fluid, a feat not achievable by conduction-type tools.

FIG. 2 shows a related art conduction-type logging tool. In particular, FIG. 2 shows a tool 20 disposed within a borehole 22. The tool 20 could be wireline device, or a part of a bottomhole assembly of a MWD process. The conduction-type tool 20 of FIG. 2 may comprise a toroidal transmitting or source winding 24, and two secondary toroidal windings 26 and 28 displaced therefrom. Unlike the induction tool of FIG. 1, the related art conduction tool exemplified in FIG. 2 operates by inducing a current flow into the fluid within the borehole 22 and through the surrounding formation 30. Thus, this tool is operational only in environments where the fluid within the borehole 22 is sufficiently conductive, such as saline water based drilling fluids. The source 24 and measurement toroids 26 and 28 are used in combination to determine an amount of current flowing on or off of the tool 20. The source toroid 24 induces a current flow axially within the tool 20, as indicated by dashed line 31. A portion of the axial current flows on (or off) the tool below toroid 28 (exemplified by dashed line 33), a portion flows on (or off) the tool body between the toroid 26 and 28 (exemplified by dashed line 35), and further some of the current flows on (or off) the tool at particular locations, such as button electrode 32 (exemplified by dashed line 37). Thus, the tool 20 of FIG. 2 determines the resistivity of a surrounding formation by calculating an amount of current flow induced in the formation as measured by a difference in current flow between toroid 28 and 26. As will be appreciated by one of ordinary skill in the art, the current measurement made by the toroids 26 and 28 is not azimuthally sensitive; however, for tools that include a button electrode 32, it is possible to measure current that flows onto or off the button 32, which is azimuthally sensitive.

Thus, wave propagation tools such as that shown in FIG. 1 may be used in oil-based drilling muds, but are not azimuthally sensitive. The conduction tools such as that shown in FIG. 2 are only operational in conductive environments (it is noted that the majority of wells drilled as of the writing of this application use a non-conductive drilling fluid), but may have the capability of making azimuthally sensitive resistivity measurements. While each of the wave propagation tool of FIG. 1 and conduction tool of FIG. 2 has its uses in particular circumstances, neither device is capable of performing azimuthally sensitive resistivity measurements in oil-based drilling fluids.

Thus, what is needed in the art is a system and related method to allow azimuthally sensitive measurements for borehole imaging or for formation resistivity measurements.

BRIEF SUMMARY OF SOME OF THE PREFERRED EMBODIMENTS

The problems noted above are solved in large part by a ruggedized multi-layer printed circuit board (PCB) based antenna suitable for downhole use. More particularly, the specification discloses an antenna having a ferrite core with windings around the ferrite core created by a plurality of conductive traces on the upper and lower circuit board coupled to each other through the various PCB layers. The PCB based ferrite core antenna may be used as either a source or receiving antenna, and because of its size is capable of making azimuthally sensitive readings.

More particularly, the ruggedized PCB based ferrite core antenna may be utilized on a downhole tool to make azimuthally sensitive resistivity measurements, and may also be used to make resistivity based borehole wall images. In a first embodiment, a tool comprises a loop antenna at a first elevation used as an electromagnetic source. At a spaced apart location from the loop antenna a plurality of PCB based ferrite core antennas are coupled to the tool along its circumference. The loop antenna generates an electromagnetic signal that is detected by each of the plurality of PCB based ferrite core antennas. The electromagnetic signal received by the PCB based ferrite core antennas are each in azimuthally sensitive directions, with directionality dictated to some extent by physical placement of the antenna on the tool. If the spacing between the loop antenna and the plurality of PCB based antennas is relatively short (on the order of six inches), then the tool may perform borehole imaging. Using larger spacing between the loop antenna and the plurality of PCB based ferrite core antennas, and a second plurality of PCB based ferrite core antennas, azimuthally sensitive electromagnetic wave resistivity measurements of the surrounding formation are possible.

In a second embodiment, a first plurality of PCB based ferrite core antennas are spaced around the circumference of a tool at a first elevation and used as an electromagnetic source. A second and third plurality of PCB based ferrite core antennas are spaced about the circumference of the tool at a second and third elevation respectively. The first plurality of PCB based antennas may be used sequentially, or simultaneously, to generate electromagnetic signals propagating to and through the formation. The electromagnetic waves may be received by each of the second and third plurality of PCB based antennas, again allowing azimuthally sensitive resistivity determinations.

Because the PCB based ferrite core antennas of the preferred embodiment are capable of receiving electromagnetic wave propagation in an azimuthally sensitive manner, and because these antennas are operational on the philosophy of an induction-type tool, it is possible to utilize the antennas to make azimuthally sensitive readings in drilling fluid environments where conductive tools are not operable.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct mechanical or electrical (as the context implies) connection, or through an indirect mechanical or electrical connection via other devices and connections.

DETAILED DESCRIPTION OF THE PREFERRED EMBODIMENTS

This specification discloses a ruggedized printed circuit board (PCB) based ferrite core antenna for transmitting and receiving electromagnetic waves. The PCB based antenna described was developed in the context of downhole logging tools, and more particularly in the context of making azimuthally sensitive electromagnetic wave resistivity readings. While the construction of the PCB based antenna and its use will be described in the downhole context, this should not be read or construed as a limitation as to the applicability of the PCB based antenna.

Figure 3:
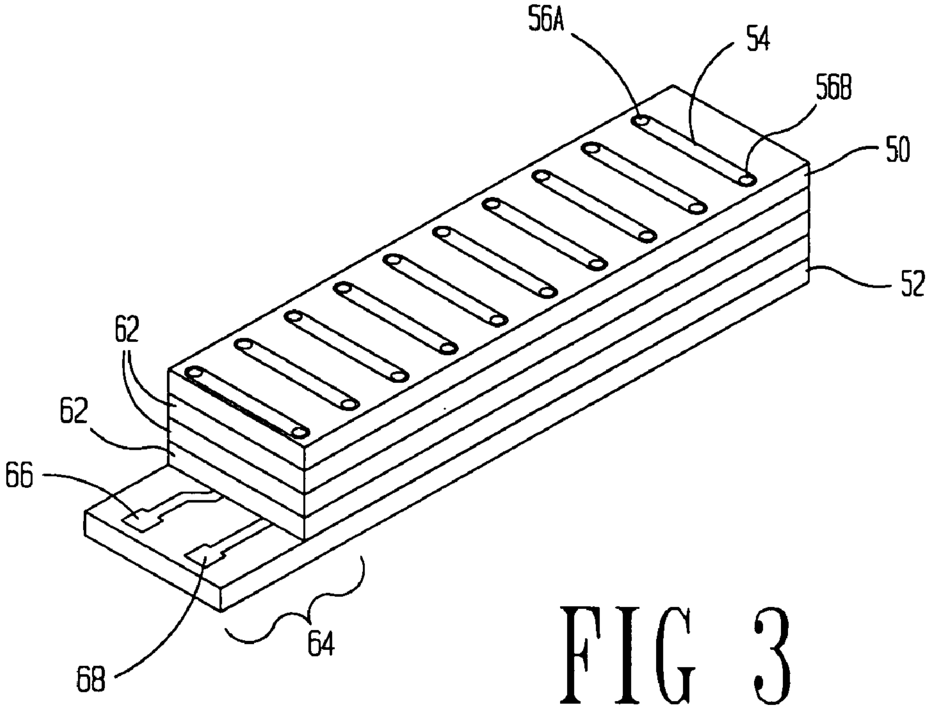
FIG. 3 shows a perspective view of a PCB based ferrite core antenna of an embodiment.

FIG. 3 shows a perspective view of a PCB based ferrite core antenna of the preferred embodiments. In particular, the PCB based ferrite core antenna comprises an upper board 50 and a lower board 52. The upper board 50 comprises a plurality of electrical traces 54 that span the board 50 substantially parallel to its width or short dimension. In the embodiment shown in FIG. 3, ten such traces 54 are shown; however, any number of traces may be used depending upon the number of turns required of a specific antenna. At the end of each trace 54 is a contact hole, for example holes 56A, B, which extend through the upper board 50. As will be discussed more thoroughly below, electrical contact between the upper board 50 and the lower board 52 preferably takes place through the contact holes at the end of the traces.

Figure 4:
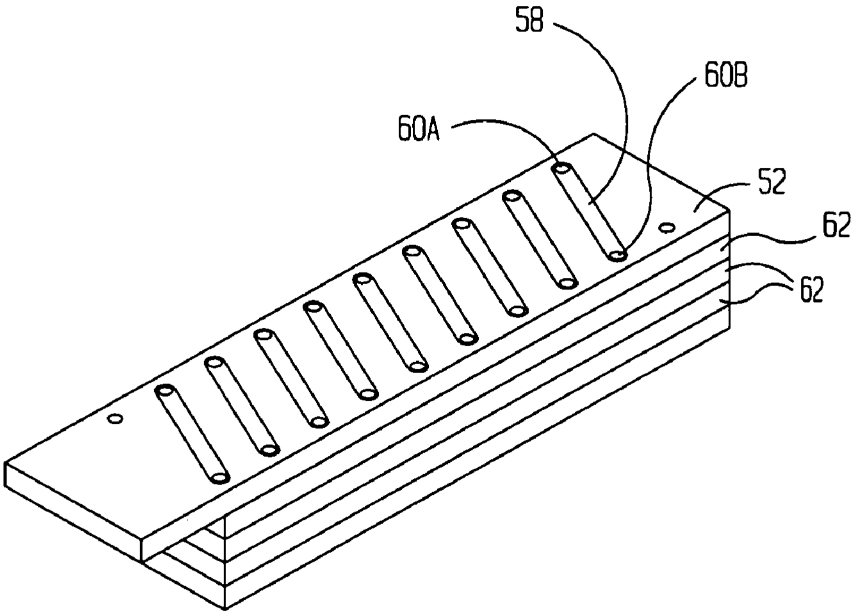
FIG. 4 shows yet another view of the PCB based ferrite core antenna.

FIG. 4 shows a perspective view of the antenna of FIG. 3 with board 52 in an upper orientation. Similar to board 50, board 52 comprises a plurality of traces 58, with each trace having at its ends a contact hole, for example holes 60A and B. Unlike board 50, however, the traces 58 on board 52 are not substantially parallel to the shorter dimensions of the board, but instead are at a slight angle. Thus, in this embodiment, the board 52 performs a cross-over function such that electrical current traveling in one of the traces 54 on board 50 crosses over on the electrical trace 58 of board 52, thus forcing the current to flow in the next loop of the overall circuit.

Referring somewhat simultaneously to FIGS. 3 and 4, between the board 50 and board 52 reside a plurality of intermediate boards 62. The primary function of an intermediate board 62 is to contain the ferrite material between board 50 and board 52, as well as to provide conduction paths for the various turns of electrical traces around the ferrite material. In the perspective views of FIGS. 3 and 4, the board 52 is elongated with respect to board 50, and thus has an elongated section 64 (FIG. 3). In this embodiment, the elongated section 64 of board 52 has a plurality of electrical contacts, namely contact points 66 and 68. In this embodiment, the contact points 66 and 68 are the location where electrical contact is made to the PCB based ferrite core antenna. Thus, these are the locations where transmit circuitry is coupled to the antenna for the purpose of generating electromagnetic waves within the borehole. Likewise, since the PCB based ferrite core antennas may be also used as receiving antennas, the electrical contact points 66 and 68 are the location where receive circuitry is coupled to the antenna.

Figure 5:
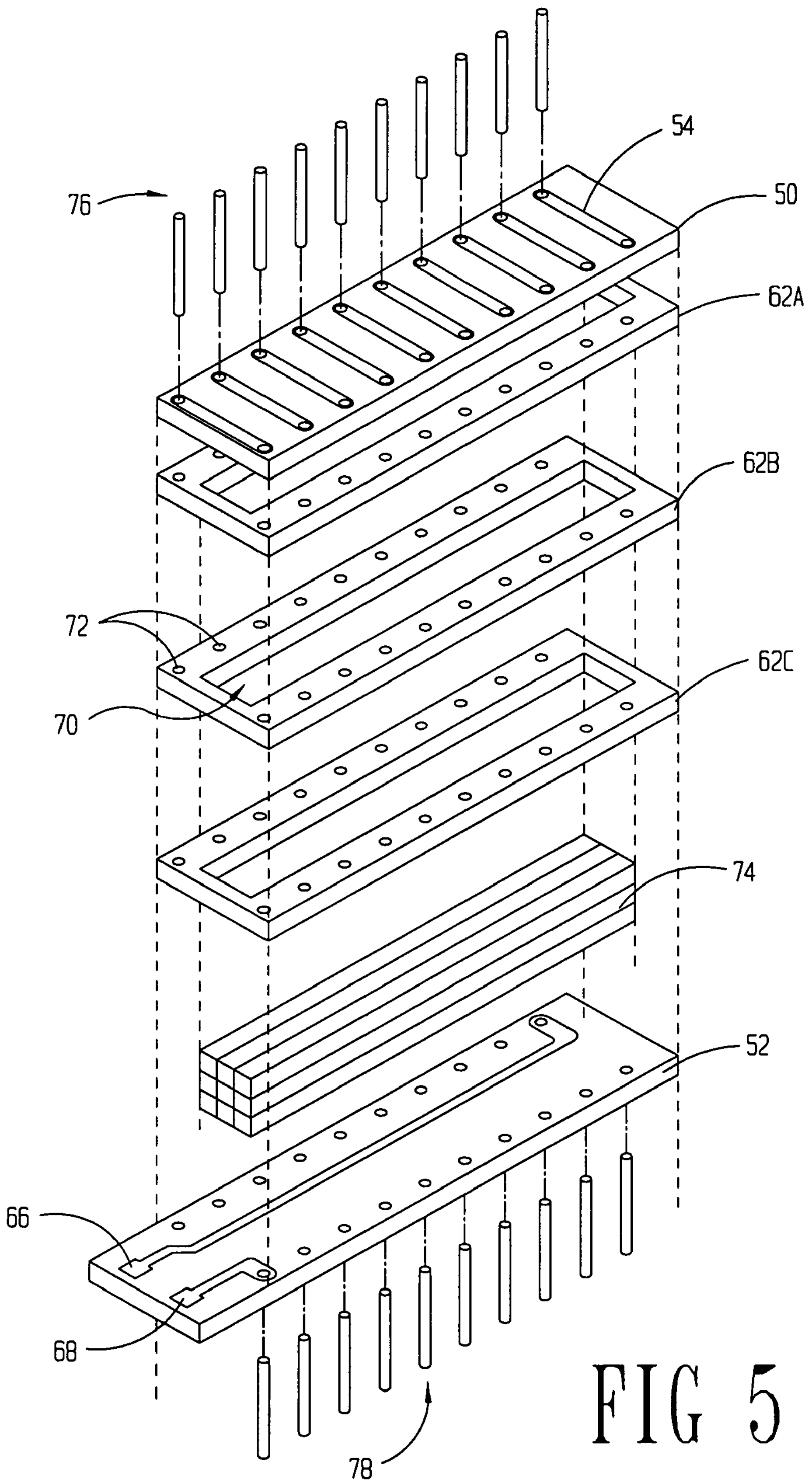
FIG. 5 shows an exploded view of the embodiment of a PCB based ferrite core antenna shown in FIG. 3.

FIG. 5 shows an exploded perspective view of the PCB based ferrite core antenna FIGS. 3 and 4. In particular, FIG. 5 shows board 50 and board 52, with the various components normally coupled between the two boards in exploded view. FIG. 5 shows three intermediate boards 62A, B and C, although any number may be used based on the thickness of the boards, and the amount of ferrite material to be contained therein, and whether it is desirable to completely seal the ferrite within the boards. Each of the intermediate boards 62 comprises a central hole 70, and a plurality of interconnect holes 72 extending along the long dimension. As the intermediate boards 62 are stacked, their central holes form an inner cavity where a plurality of ferrite elements 74 are placed. The intermediate boards 62, along with the ferrite material 74, are sandwiched between the board 50 and the board 52. In one embodiment, electrical contact between the traces 54 of board 50 and the traces 58 of board 52 (not shown in FIG. 5) is made by a plurality of contact wires or pins 76. The contact pins 76 extend through the contact holes 56 in the upper board, the holes 72 in the intermediate boards, and the holes 60 in board 52. The length of the contact pins is dictated by the overall thickness of the PCB based antenna, and electrical contact between the contact pins and the traces is made by soldering each pin to the trace 54 and 58 that surround the contact hole through which the pin extends. In a second embodiment, rather than using the contact pins 76 and 78, the PCB based ferrite core antenna is manufactured in such a way that solder or other electrically conductive material extends between the board 50 and the board 52 through the connection holes to make the electrical contact. Thus, the electrically conductive material, whether solder, contact wires, or other material, electrically couples to the traces on the boards 50 and 52, thereby creating a plurality of turns of electrically conductive path around the ferrite core.

The materials used to construct board 50, board 52, or any of the intermediate boards 62 may take several forms depending on the environment in which the PCB based antenna is used. In harsh environments where temperature ranges are expected to exceed 200° C., the boards 50, 52 and 62 are made of a glass reinforced ceramic material, and such material may be obtained from Rogers Corporation of Rogers, Conn. (for example material having part number R04003). In applications where the expected temperature range is less than 200° C., the boards 50, 52 and 62 may be made from glass reinforced polyamide material (conforming to IPC-4101, type GIL) available from sources such as Arlon, Inc. of Bear, Del., or Applied Signal, Inc. Further, in the preferred embodiments, the ferrite material in the central or inner cavity created by the intermediate boards 62 is a high permeability material, preferably Material 77 available from Elna Magnetics of Woodstock, N.Y. As implied in FIG. 5, the ferrite core 74 of the preferred embodiments is a plurality of stacked bar-type material; however, the ferrite core may equivalently be a single piece of ferrite material, and may also comprise a dense grouping of ferrite shavings, or the like.

Further, FIG. 5 shows how the contacts 66 and 68 electrically couple to the traces 54 and 58. In particular, in the embodiment shown in FIG. 5, the electrical contact 66 extends along the long dimension of board 52, and surrounds a contact hole at the far end. Whether the connection pins 76, 78 are used, or whether other techniques for connecting traces on multiple levels of circuit board are used, preferably the trace 66 electrically couples to the winding created by the traces 54, traces 58 and interconnections between the traces. Likewise, the connection pad 68 electrically couples to a trace that surrounds a closest contact hole on the opposite side of the connection made for pad 66. Through techniques already discussed, the contact point 68 is electrically coupled to the windings of the antenna. Although not specifically shown in FIG. 5, the ferrite core 74 is electrically isolated from the traces. This isolation may take the form of an insulating sheet, or alternatively the traces could be within the non-conductive board 52 itself.

Before proceeding, it must be understood that the embodiment shown in FIGS. 3, 4 and 5 is merely exemplary of the idea of using traces on a printed circuit board, as well as electrical connections between various layers of board, to form the windings or turns of electrical conduction path around a ferrite core held in place by the PCBs. In one embodiment, the ferrite core is sealed within the inner cavity created by the intermediate boards by having those intermediate boards seal to each other. However, depending on the type of ferrite material used, or the proposed use of the antenna (or both), it would not be necessary that the intermediate boards seal to one another. Instead, the connecting pins 76 and 78 could suspend one or more intermediate boards between the boards 50, 52 having the electrical traces, thus keeping the ferrite material within the cavity defined by the intermediate boards, and also keeping the ferrite material from coming into electrical contact with the connecting pins. Further, the embodiment of FIGS. 3, 4 and 5 has extended portions 64 of board 52 to provide a location for the electrical coupling of signal wires. However, this extended portion 64 need not be present, and instead the wires for electrically coupling the PCB based ferrite core antenna could solder directly to appropriate locations on the antenna. Further still, depending upon the particular application, the PCB based ferrite core antenna may also itself be encapsulated in a protective material, such as epoxy, in order that the board material not be exposed to the environment of operation. Further still, techniques exist as of the writing of this specification for embedding electrical traces within a printed circuit board such that they are not exposed, other than their electrical contacts, on the surfaces of the printed circuit board, and this technology too could be utilized in creating the board 50 and board 52. Moreover, an embodiment of the PCB based ferrite core antenna such as that shown in FIGS. 3, 4 and 5 may have a long dimension of approximately 8 centimeters, a width approximately 1.5 centimeters and a height of approximately 1.5 centimeters. A PCB based ferrite core antenna such as that shown in FIGS. 3, 4 and 5 with these dimensions may be suitable for azimuthally sensitive formation resistivity measurements. In situations where borehole imaging is desired, the overall size may become smaller, but such a construction does not depart from the scope and spirit of this invention.

Figure 1:
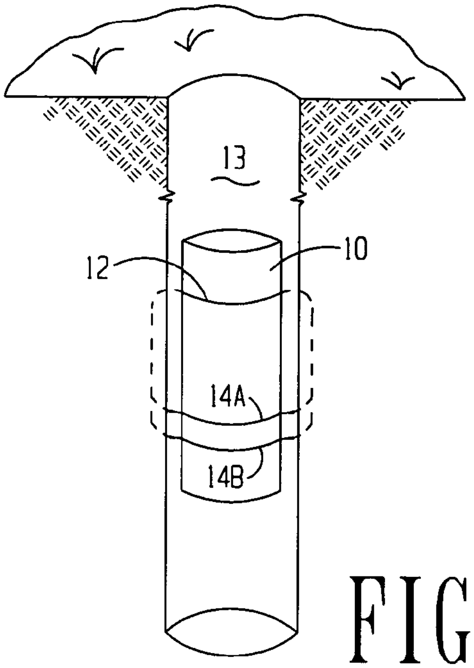
FIG 1 ( PRIOR ART )
FIG. 1 shows a related art induction-type tool.
Figure 2:
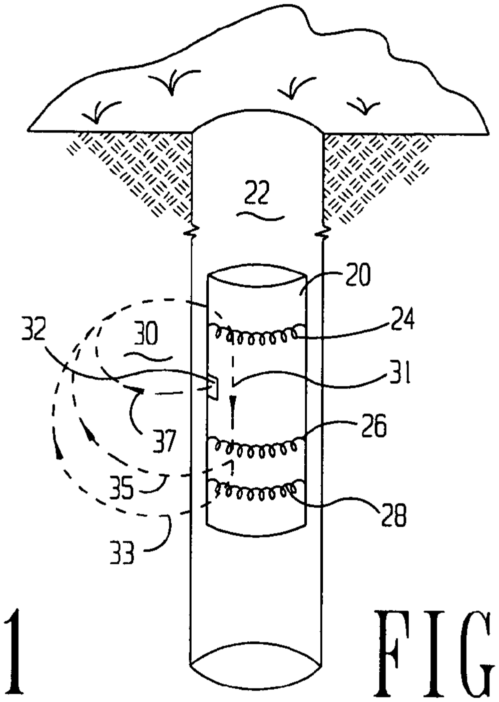
FIG 2 ( PRIOR ART )
FIG. 2 shows a related art conduction-type tool.
Figure 6:
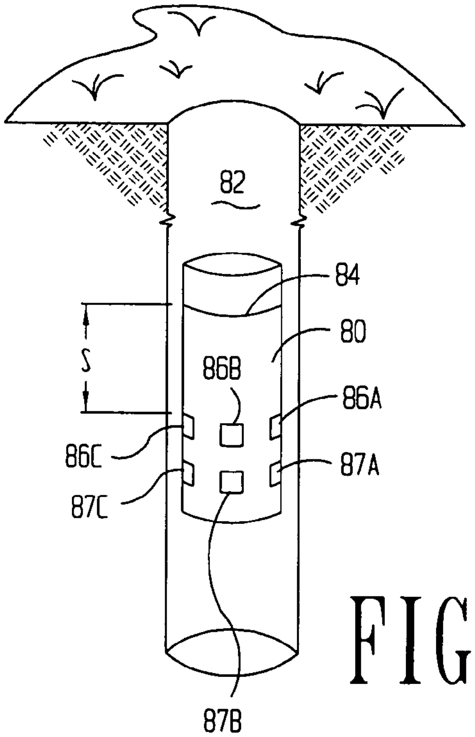
FIG. 6 shows an embodiment of use of PCB based ferrite core antennas in a downhole tool.

FIG. 6 shows an embodiment utilizing the PCB based ferrite core antennas. In particular, FIG. 6 shows a tool 80 disposed within a borehole 82. The tool 80 could be a wireline device, or the tool 80 could be part of a bottomhole assembly of a measuring-while-drilling (MWD) system. In this embodiment, the source is a loop antenna 84. As is known in the art, a loop antenna 84 generates omni-directional electromagnetic radiation. The tool 80 of the embodiment shown in FIG. 6 also comprises a first plurality of PCB based ferrite core antennas 86 coupled at a location on the tool 80 having a spacing S from the loop antenna 84, and a second plurality of PCB based ferrite core antennas 87 coupled to the tool below the first plurality. FIG. 6 shows only three such PCB based ferrite core antennas in the first and second plurality (labeled 86A, B, C and 87A, B, C); however, any number of PCB based ferrite core antennas may be spaced along the circumference of the tool 80 at these locations. Preferably, however, eight PCB based ferrite core antennas 86 are evenly spaced around the circumference of the tool 80 at each of the first and second pluralities. Operable embodiments may have as few as four antennas, and high resolution tools may comprises sixteen, thirty-two or more. The source antenna 84 creates electromagnetic wave, and each of the PCB based ferrite core antennas 86, 87 receives a portion of that propagating electromagnetic wave. Because the PCB based ferrite core antennas are each disposed at a particular circumferential location, and because the antennas are mounted proximate to the metal surface of the tool 80, the electromagnetic wave received is localized to the portion of the borehole wall or formation through which that wave propagated. Thus, having a plurality of PCB based ferrite core antennas allows, in this embodiment, taking of azimuthally sensitive readings. The type of readings are dependent, to some extent, on the spacing S between the plurality of antennas 86 and the loop antenna 84. For spacings between the source and the first plurality 86 on the order of six inches, a tool such as that shown in FIG. 6 may be particularly suited for performing electromagnetic resistivity borehole wall imaging. In this arrangement, the second plurality 87, if used, may be spaced approximately an inch from receivers 86. For greater spacings, on the order of eight inches or more to the first plurality 86 and fourteen to eighteen inches to the second plurality, the tool may be particularly suited for making azimuthally sensitive formation resistivity measurements.

Figure 7:
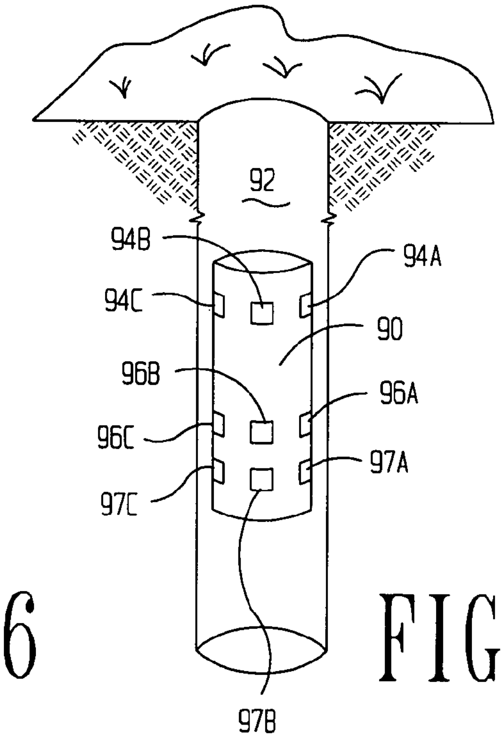
FIG. 7 shows a second embodiment of use of PCB based ferrite core antennas in a downhole tool.

Referring now to FIG. 7, there is shown an alternative embodiment where, rather than using a loop antenna as the source, a plurality of PCB based ferrite core antennas are themselves used to generate the electromagnetic waves source. In particular, FIG. 7 shows a tool 90 disposed within a borehole 92. The tool 90 could be a wireline device, or also could be a tool within a bottomhole assembly of an MWD process. In this embodiment, electromagnetic waves source are generated by a plurality of PCB based ferrite core antennas 94, whose construction was discussed above. Although the exemplary drawing of FIG. 7 shows only three such antennas 94A, B and C, any number of antennas may be spaced around the circumference of the tool, and it is preferred that eight such antennas are used. Similar to the embodiment shown in FIG. 6, the embodiment of FIG. 7 comprises a first and second plurality of PCB based ferrite core antennas 96, 97, used as receivers, spaced along the circumference of the tool 90 at a spaced apart location from the plurality of transmitting antennas 94. In the perspective view of FIG. 7, only three such receiving antennas 96A, B and C are visible for the first plurality, and only three receiving antennas 97A, B and C are visible for the second plurality; however, any number of antennas may be used, and preferably eight such antennas are utilized at each of the first and second plurality. Operation of the tool 90 of FIG. 7 may alternatively comprise transmitting electromagnetic wave with all of the transmitting antennas 94 simultaneously, or may alternatively comprise firing each of the transmitting antennas 96 sequentially. In a fashion similar to that described with respect to FIG. 6, receiving the electromagnetic wave generated by the source antennas 94 is accomplished with each individual receiving antenna 96, 97. By virtue of circumferential spacing about the tool 90, the electromagnetic wave propagation received is azimuthally sensitive. A tool such as that shown in FIG. 7 may be utilized for borehole imaging as previously discussed, or may likewise be utilized for azimuthally sensitive formation resistivity measurements.

Figure 8:
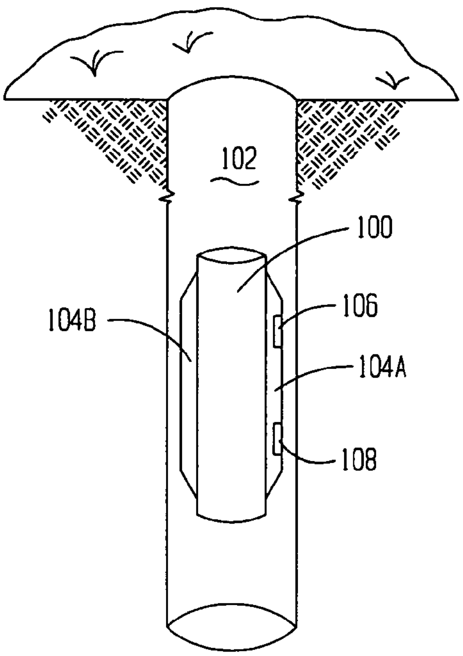
FIG. 8 shows yet another implementation for PCB based ferrite core antennas in a downhole tool.

FIG. 8 shows yet another embodiment of an electromagnetic wave resistivity device using the PCB based ferrite core antennas as described above. In particular, FIG. 8 shows a tool 100 disposed within a borehole 102. The tool 100 may be a wireline device, or the tool may be part of a bottomhole assembly of a MWD operation. In the embodiment shown in FIG. 8, the tool 100 comprises one or more stabilizing fins 104A, B. In this embodiment, the PCB based ferrite core antennas are preferably placed within the stabilizing fin 104 near its outer surface. In particular, the tool may comprise a source antenna 106 and a receiving antenna 108 disposed within the stabilizer fin 104A. It is noted in this particular embodiment that the tool 100 may serve a dual purpose. In particular, the tool 100 may be utilized for other functions, such as neutron porosity, with the neutron sources and sensors disposed at other locations in the tool, such as within the stabilizing fin 104B. Operation of a tool such as tool 100 is similar to the previous embodiments in that the source antenna 106 generates electromagnetic wave, which is received by the receiving antenna 108. By virtue of the receiving antenna's location on a particular side of a tool 100, the electromagnetic wave radiation received is azimuthally sensitive. If the tool 100 rotates, borehole imaging is possible. An additional receiver antenna could be placed within the stabilizing fin 104A which allows azimuthally sensitive resistivity measurements.

Figure 9:
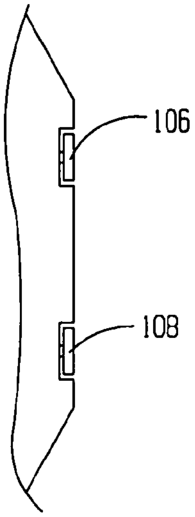
FIG. 9 shows placing of the PCB based ferrite core antennas in recesses.

Although it has not been previously discussed, FIG. 9 indicates that the source antenna 106 and the receiving antenna 108 are mounted within recesses. In fact, in each of the embodiments of FIGS. 6, 7 and 8, the preferred implementation is mounting of the PCB base ferrite core antennas is in recesses on the tool. With respect to FIGS. 6 and 7, the recesses are within the tool body itself. With respect to FIG. 8, the recesses are on the stabilizing fin 104A. Although the printed circuit board based ferrite core antennas, if operated in free space, would be omni-directional, because of their small size relative to the tool body, and the fact they are preferably mounted within recess, they become directionally sensitive. Additional directional sensitivity is accomplished by way of a cap arrangement.

Figure 10:
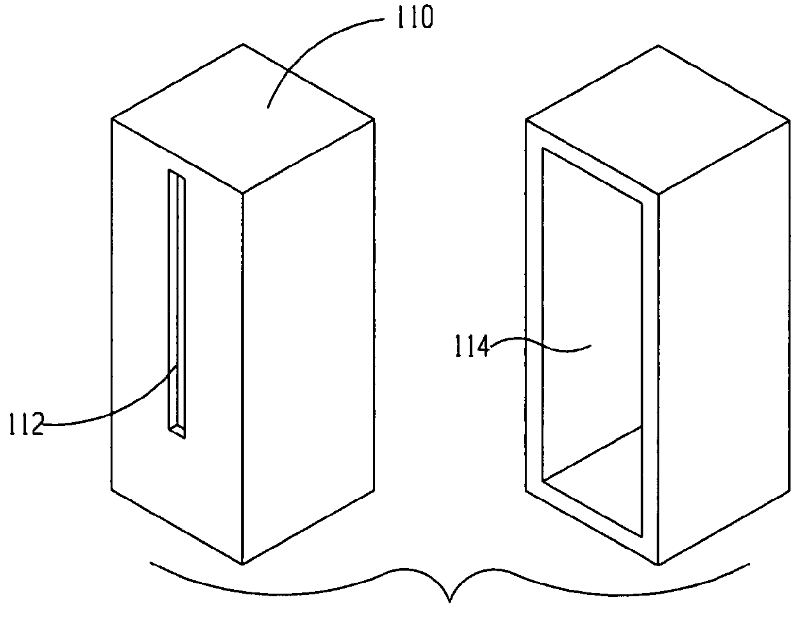
FIG. 10 shows a cap or cover for increasing the directional sensitivity of PCB based ferrite core antennas when used as receivers.

FIG. 10 shows an exemplary cap arrangement for covering the PCB based ferrite core antennas to achieve greater directionality. In particular, cap 110 comprises a hollowed out inner surface 114, having sufficient volume to cover a PCB based ferrite core antenna. In a front surface of the cap 100, there is a slot 112. Operation of the cap 110 in any of the embodiments involves placing the cap 110 over the receiving antenna (86, 96 or 108) with the cavity 112 covering the PCB based ferrite core antenna, and the slot 112 exposed to an outer surface of the tool (80, 90 or 100). Electromagnetic wave radiation, specifically the magnetic field components, created by a source (whether a loop or other PCB based ferrite core antenna) could access, and therefore induce a current flow in, the PCB based ferrite core antenna within the cap through the slot 112. The smaller the slot along its short distance, the greater the directional sensitivity becomes; however, sufficient slot is required such that the electromagnetic wave radiation may induce sufficient current for detection.

Although not specifically shown in the drawings, each of the source antennas and receiving antennas is coupled to an electrical circuit for broadcasting and detecting electromagnetic signals respectively. One of ordinary skill in the art, now understanding the construction and use of the PCB based ferrite core antennas will realize that existing electronics used in induction-type logging tools may be coupled to the PCB based ferrite core antennas for operational purposes. Thus, no further description of the specific electronics is required to apprise one of ordinary skill in the art how to use the PCB based ferrite core antennas of the various described embodiments with respect to necessary electronics.

The above discussion is meant to be illustrative of the principles and various embodiments of the present invention. Numerous variations and modifications will become apparent to those skilled in the art once the above disclosure is fully appreciated. For example, in the embodiments shown in FIGS. 6 and 7, there are two levels of receiving antennas. For formation resistivity measurements, having two levels of receiving antennas may be required, such that a difference in received amplitude and difference in received phase may be determined. For use of the PCB based ferrite core antennas in borehole imaging tools, the second level of receiving antennas is optional. Correspondingly, the embodiment shown in FIG. 8 having only one transmitting antenna and one receiving antenna, thus particularly suited for borehole wall imaging, may likewise include an additional receiving antenna and, with proper spacing, may also be used as a formation resistivity testing device. It is intended that the following claims be interpreted to embrace all such variations and modifications.

What is claimed is:

1. A method comprising:

drilling a borehole with a drill string comprising an electromagnetic radiation based resistivity tool, the resistivity tool defines an azimuth perpendicular to a direction of drilling; and imaging the borehole during the drilling with the electromagnetic radiation based resistivity tool by:

transmitting an electromagnetic signal from a transmitting antenna on the resistivity tool; and receiving a portion of the electromagnetic signal by a receiving antenna that has a reception pattern within predefined azimuthal directions less than all azimuthal directions, and the receiving antenna spaced apart from the transmitting antenna.

2. The method as defined in claim 1 wherein transmitting an electromagnetic signal from the transmitting antenna further comprises transmitting an omni-directional electromagnetic signal from the transmitting antenna being a loop antenna.

3. The method as defined in claim 1 wherein transmitting an electromagnetic signal from a transmitting antenna further comprises transmitting the electromagnetic signal from a plurality of azimuthally directional transmitting antennas.

4. The method as defined in claim 1 wherein receiving the electromagnetic signal further comprises receiving at least a portion of the electromagnetic signal at a plurality of receiving antennas, each receiving antenna receives only from predefined azimuthal directions less than all azimuthal directions.

5. The method as defined in claim 4 further comprising:

receiving portions of the electromagnetic signal at a first plurality of receiving antennas at a first spaced apart distance from the transmitting antenna, each of the first plurality of receiving antenna receives only from respective predefined azimuthal directions less than all azimuthal directions; and receiving portions of the electromagnetic signal at a second plurality of receiving antennas at a second spaced apart distance from the transmitting antenna, each of the second plurality of receiving antenna receives only from respective predefined azimuthal directions less than all azimuthal directions.

6. A method comprising:

drilling a borehole with a drill string comprising an electromagnetic radiation based resistivity tool; and imaging the borehole during the drilling with the electromagnetic radiation based resistivity tool by:

transmitting an electromagnetic signal from a blade coupled to the resistivity tool body; and receiving the electromagnetic signal at an azimuthally sensitive receiving antenna on the resistivity tool, the receiving antenna spaced apart from the transmitting antenna.

7. The method as defined in claim 6 wherein receiving the electromagnetic signal at the receiving antenna further comprises receiving the electromagnetic signal at the receiving antenna on the blade.

8. The method as defined in claim 6 wherein transmitting further comprises transmitting from a stabilizer blade.

9. The method as defined in claim 7 wherein receiving further comprises receiving with the receiving antenna on a stabilizer blade.

10. A downhole tool comprising:

a source antenna mechanically coupled to a body of the downhole tool, the source antenna generates electromagnetic radiation;

a first receiving antenna mechanically coupled to the body of the downhole tool at a first location spaced apart from the source antenna, the first receiving antenna disposed on a portion of the circumference of the body less than the entire circumference, and the first receiving antenna receives electromagnetic radiation from a particular azimuthal direction; and wherein the downhole tool makes electromagnetic radiation based borehole wall images while drilling.

11. The downhole tool as defined in claim 10 wherein the source antenna is a loop antenna disposed around the circumference of the body of the downhole tool.

12. The downhole tool as defined in claim 10 further comprising a second receiving antenna mechanically coupled to the body of the downhole tool at a second location spaced apart from the source antenna, the second receiving antenna disposed on a portion of the circumference of the body less than the entire circumference, and the second receiving antenna receives electromagnetic radiation from a particular azimuthal direction.

13. The downhole tool as defined in claim 10 wherein the first and second receiving antennas are disposed at the same elevation on the tool.

14. A downhole tool comprising:

a source antenna mechanically coupled to a body of the downhole tool, the source antenna generates electromagnetic radiation;

a receiving antenna mechanically coupled to body of the downhole tool spaced apart from the source antenna, wherein the receiving antenna further comprises a printed circuit board based ferrite core antenna, and the receiving antenna receives electromagnetic radiation from a particular azimuthal direction; and wherein the downhole tool makes electromagnetic radiation based borehole wall images while drilling.

15. The downhole tool as defined in claim 14 wherein the printed circuit board based ferrite core antenna is covered by a cap with a slot therein to increase directional sensitivity.

16. The downhole tool as defined in claim 15 wherein the printed circuit board based ferrite core antenna is mounted approximately six inches from the source antenna.

17. The downhole tool as defined in claim 14 wherein the source antenna further comprises a printed circuit board based ferrite core antenna.

18. The downhole tool as defined in claim 14 further comprising a plurality of printed circuit board based ferrite core receiving antennas mounted about a circumference of the body of the downhole tool.

19. The downhole tool as defined in claim 18 wherein each of the plurality of receiving antennas are mounted approximately six inches from an elevation of the source antenna.

20. The downhole tool as defined in claim 19 further comprising a second plurality of receiving antennas mounted about the circumference of the body of the downhole tool.

21. The downhole tool as defined in claim 20 wherein each of the plurality of receiving antennas are mounted approximately seven inches from an elevation of the source antenna.

22. A downhole tool comprising:

one or more antenna coils circumferentially spaced around a tool body, each of the one or more antenna coils on a stabilizer blade; and wherein the one or more antenna coils obtain an electromagnetic radiation based borehole wall image.

23. The downhole tool as defined in claim 22 wherein the tool is part of a bottom hole assembly of a drilling operation.

24. A method comprising:

drilling a borehole with a drill string comprising an electromagnetic radiation based resistivity tool; and imaging the borehole during the drilling with the electromagnetic radiation based resistivity tool by:

transmitting an electromagnetic signal from a stabilizer blade coupled to the resistivity tool body; and receiving the electromagnetic signal at receiving antenna on the resistivity tool, the receiving antenna spaced apart from the transmitting antenna.

25. The method as defined in claim 24 wherein receiving the electromagnetic signal at the receiving antenna further comprises receiving the electromagnetic signal at the receiving antenna on the stabilizer blade.

26. The method as defined in claim 24 wherein receiving further comprises receiving by the receiving antenna that is azimuthally sensitive.

* * * * *